United States Patent Office 3,226,366
Patented Dec. 28, 1965

3,226,366
PROCESS FOR PREPARING POLYOXYMETHYLENES WHICH ARE STABLE TO THE ACTION OF HEAT
Silvio Bezzi and Guido Galiazzo, Padova, and Alberto Bandel, Venice, Italy, assignors to Montecatini Società Generale per l'Industria Mineraria e Chimica, a corporation of Italy
No Drawing. Filed Mar. 27, 1962, Ser. No. 182,964
Claims priority, application Italy, Mar. 30, 1961, 5,626/61
5 Claims. (Cl. 260—67)

Staudinger, in his classical investigations on polyoxymethylenes, found that it was possible to convert polyoxymethylene dihydroxides to polyoxymethylene diacetates, not only by heating with acetic anhydride (Ann., 473, 1929, page 145), but also by analogous treatments with methylene glycol diacetate (Helv. Chim. Acta, 8, 1925, page 50).

In the case of acetylations with methyleneglycol acetate a heating at relatively low temperature (140–150° C.) was carried out by Staudinger for very prolonged times (70 hours) using one part of dioxymethylene diacetate for one part of polyoxymethylene dihydroxide. Under these conditions a demolition of the polymer molecule was caused, whereby mixtures of diacetate polyoxymethylenes of very low molecular weight were obtained.

We have now found that by carrying out the acetylation with methyleneglycol diacetate at higher temperatures, that is by operating at 170° C. and above, any process of polymer demolition becomes extremely moderate, so that high molecular weight polyoxymethylenes diacetate may be obtained, which polyoxymethylenes are particularly suitable for the use as thermoplastic materials. In fact, a rapid and complete dissolution of the polymer occurs at high temperatures, and a rapid acetylation by transesterification is achieved.

Our investigations resulted in ascertaining that methyleneglycol diacetate is an acetylating agent which is to be preferred to acetic anhydride because use of the former results in less demolition of the treated polymer. This is illustrated in Table I wherein examples of acetylation are reported which are carried out under the same experimental conditions with both acetylating agents.

TABLE 1

*Comparison of reduced viscosities of polyoxymethylenes stabilized with acetic anhydride and glycol acetate*

| Product | Stabilizing (Acetylating) Agent | |
|---|---|---|
| | Acetic anhydride | Methyleneglycol diacetate |
| 1 | 0.46 | 0.48 |
| 2 | 0.80 | 0.93 |
| 3 | 0.86 | 1.10 |
| 4 | 2.62 | 3.40 |

Products having different molecular complexity have been employed for the above tests, these products being prepared either by polymerization in the gaseous phase through a topochemical reaction as disclosed in pending U.S. patent application Serial No. 88,274, filed on February 10, 1961 (products 3 and 4), or by polymerization in aqueous solution as disclosed in pending U.S. patent application Serial No. 168,220, filed on January 23, 1962 (products 1 and 2). Reduced viscosities ($\eta_{sp}$/C.) have been measured in dimethylformamide at 150° C.

From examination of the tabulated data it is observed that the products stabilized with methyleneglycol diacetate show viscosities from 5 to 30% higher than the viscosities of products stabilized with acetic anhydride; further, the higher the viscosity, the more appreciable the improvement.

A further proof that methyleneglycol diacetate is a milder reactant and causes demolition side reactions of the polymer to a lesser degree is illustrated in Table 2. The values of reduced viscosities of two different polymers stabilized with the two reactants at 170° C. for progressively increasing times are reported in this table.

TABLE 2

*Variations of reduced viscosities as a function of the stabilization time at 170° C.*

| Heating Duration at 170°C (minutes) | Methyleneglycol diacetate | Acetic anhydride |
|---|---|---|
| 5' | 0.86 | 0.44 |
| 10' | 0.85 | 0.42 |
| 20' | 0.84 | 0.41 |
| 40' | 0.86 | 0.38 |

The yield of products stabilized with methyleneglycol diacetate is remarkably improved when operating in the presence of a small amount of ketene, i.e. from about 0.5 to 3% based on the weight of the methyleneglycol diacetate. Improvement in yields of acetylated product is also realized when adding acetic anhydride in an amount of from about 3 to 30% based on the weight of the methyleneglycol diacetate. The effect of such addition on the yield is enhanced when both agents are added simultaneously. These effects are illustrated in Tables 3, 4, 5, wherein the product treated is the same as product 2 of Table 1.

TABLE 3

*Improvement of acetylation yields by ketene additions*

| Percent ketene in the methyleneglycol diacetate | Acetylation yield in percent |
|---|---|
| 0.75 | 82 |
| 1.25 | 87 |
| 2.70 | 96 |

TABLE 4

*Improvement of acetylation yields by acetic anhydride additions*

| Percent Acetic anhydride in methyleneglycol diacetate | Acetylation yield in percent |
|---|---|
| 3 | 77 |
| 10 | 84 |
| 30 | 90 |

TABLE 5

*Improvement of acetylation yields by simultaneous addition of ketene and acetic anhydride*

| Percent ketene in Methyleneglycol diacetate | Percent Acetic anhydride in methyleneglycol diacetate | Acetylation yield in percent |
|---|---|---|
| 1.4 | 3 | 87 |
| 0.6 | 10 | 93 |
| 1.4 | 30 | 100 |

In order to realize in practice the process of our invention, polyoxymethylene dihydroxide (however obtained and of any degree of polymerization) is treated with about 10 parts by weight of methyleneglycol diacetate or of mixtures thereof with the first members of the homologous series of polyoxymethylene diacetates wherein the number of oxymethylene groups is greater than one and lower than ten, and the whole is heated up to about 170–175° C. in a tilting autoclave, or in an autoclave provided with a stirrer for agitation. For products of very high molecular weight which are not wholly soluble at 170° C., stabilization is carried out at a higher temperature, up to 200–210° C.

The above temperatures are maintained for from about 5–15 minutes commencing from the moment when complete solubilization of the product is accomplished. The reaction mixture is allowed to cool until room temperature, is then centrifugated, occasionally washed with a suitable inert organic liquid, and finally is dried, preferably under vacuum.

The same operating conditions are used when using methyleneglycol diacetates containing ketene and/or acetic anhydride.

The recovered liquid retains the properties of the acetylating agent. In order to avoid accumulation therein of acetic acid originating from hydrolysis of acetates caused by water formed by the terminal groups of each member of the polyoxymethylene dihydroxides homologous series, a corresponding amount of ketene may be added periodically.

Acetic anhydride is generally also added periodically in order to prevent an excessive accumulation of higher members of the series of polyoxymethylene diacetates originating by addition of the formaldehyde which is lost from the products to be stabilized. Such accumulation is illustrated by the following equations:

$$HO(CH_2O)_n—H \rightarrow HO(CH_2O)_{n-1}+CH_2O$$

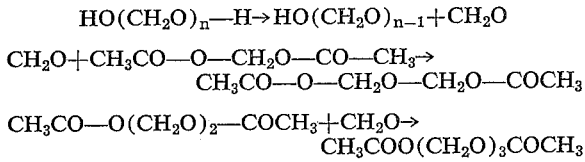

$$CH_3CO—O(CH_2O)_2—COCH_3+CH_2O \rightarrow \\ CH_3COO(CH_2O)_3COCH_3$$

The following examples will further illustrate the present invention.

EXAMPLE 1

30 g. of polyoxymethylene dihydroxide having a reduced viscosity (determined in dimethylformamide at 150° C. with a concentration of 0.5%) of 3.1, obtained by topochemical reaction according to the process disclosed in U.S. patent application Serial No. 88,274, and 300 g. of methyleneglycol diacetate having a boiling point in the range between 166° and 173° C. are introduced over a period of 20 minutes into a glass autoclave. The autoclave is heated to 200° C. for 10 minutes; i.e. the time needed for dissolving the product.

The solution is allowed to cool slowly over a period of about 2 hours to room temperature. It is filtered under vacuum and repeatedly washed with benzene, while employing totally twice as much as the weight of the employed polyoxymethylene dihydroxide. 28.5 g. of dry products are obtained, which is 95% of the theoretical amount. Thermal stability of this and of other products obtained through this process was measured by heating about 0.5 g. of product at 215° C. for 30 minutes. The results are expressed in terms of the kinetic constant of depolymerization ($K_{215}$) which is defined as the weight loss per minute referred to 100 g. of the starting polymer. For this product, $K_{215}$ was found equal to 0.1. The reduced viscosity measured in dimethylformamide at 150° C. at 0.5% concentration was found equal to 3.4.

EXAMPLE 2

20 g. of polyoxymethylene dihydroxide having a reduced viscosity (determined in dimethylformamide at 150° C. with a concentration of 0.5%) of 0.93, obtained by the process described in U.S. patent application Serial No. 168,220 filed on January 23, 1962, are treated with 200 g. methyleneglycol diacetate under the same operative conditions as in Example 1, as regards both the stabilization reaction and the subsequent washing and drying operations. 15.6 of dry product are obtained, corresponding to a yield of acetylated product of 78%. For this product the following values were obtained: $K_{215}=0.05$; reduced viscosity=0.93.

EXAMPLE 3

30 g. of product having a reduced viscosity (determined in dimethylformamide at 150° C. with a concentration of 0.5%) of 1.00, obtained by the process described in U.S. patent application Serial No. 88,274 and 300 g. of methyleneglycol diacetate containing in solution the first members of the homologous series of polyoxymethylene diacetates, and having therefore a boiling point (at 2 mm.) in the range between 45 and 120° C., are gradually heated in glass autoclave over a period of 20 minutes to 170° C. This temperature is maintained for 30 minutes, then the autoclave is cooled and the product is filtered and dried as described in the preceding examples. 26.4 g. of polymer are obtained, with a yield of 88%. $K_{215}=0.08$. Reduced viscosity, measured as indicated in the preceding examples=1.05.

Variations can of course be made without departing from the spirit of our invention.

Having thus described our invention, what we desire to secure and hereby claim by Letters Patent is:

1. A method of stabilizing a polyoxymethylene dihydroxide against heat, this method comprising acetylating said polyoxymethylene dihydroxide with an acetylating agent selected from the group consisting of methyleneglycol diacetate and mixtures of methyleneglycol diacetate with a polyoxymethylene diacetate wherein the number of oxymethylene groups is greater than 1 and lower than 10, said acetylation being carried out at a temperature of from about 170° to 210° C. for a time not exceeding about 3 hours, the weight ratio of polymer to acetylating agent being from about 1:5 to 1:15.

2. The method of claim 1 wherein said weight ratio is about 1:10.

3. The method of claim 1 wherein the acetylating agent is methyleneglycol diacetate and wherein said acetylation is carried out in the presence of from about 0.5 to 3% by weight of ketene based on the weight of methyleneglycol diacetate.

4. The method of claim 1 wherein the acetylating agent is methyleneglycol diacetate and wherein said acetylation is carried out in the presence of from about 3 to 30% by weight of acetic anhydride.

5. The method of claim 4 wherein said acetylation is carried out in the presence of from 0.5 to 3% by weight of ketene based on the weight of methyleneglycol diacetate.

References Cited by the Examiner

UNITED STATES PATENTS

| | | | |
|---|---|---|---|
| 1,942,110 | 1/1934 | Law | 260—488 |
| 2,492,955 | 1/1950 | Ballard et al. | 260—488 |

OTHER REFERENCES

Staudinger et al.: "Helv. Chim. Acta.," vol. 8, pp. 50–53, 1925.

WILLIAM H. SHORT, *Primary Examiner.*

J. E. LEVOW, L. ZETVER, LORRAINE A. WEINBERGER, *Examiners.*